Patented Nov. 4, 1930

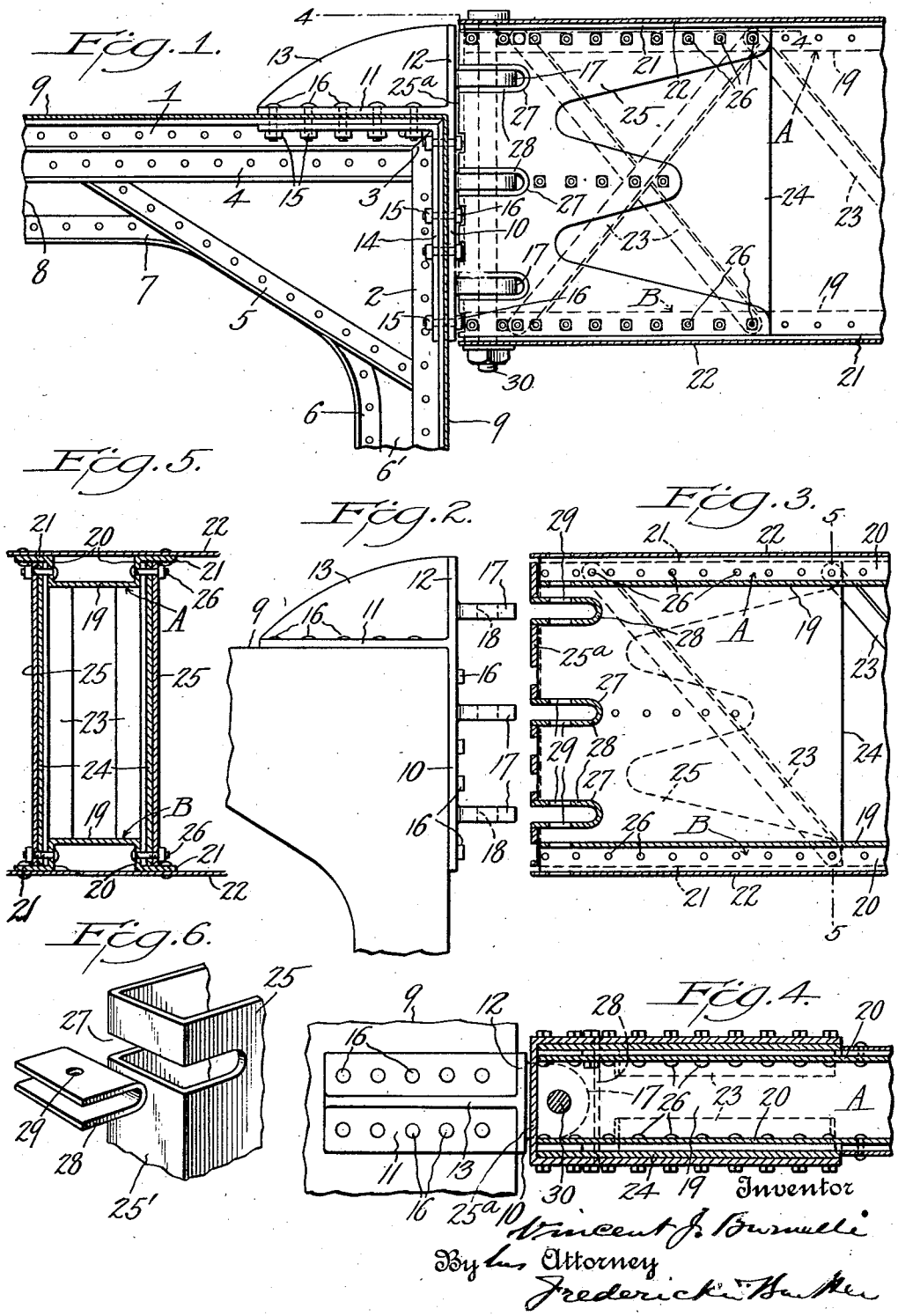

1,780,812

UNITED STATES PATENT OFFICE

VINCENT J. BURNELLI, OF NEW YORK, N. Y., ASSIGNOR, BY DIRECT AND MESNE ASSIGNMENTS, TO THE UPPERCU-BURNELLI CORPORATION, A CORPORATION OF DELAWARE

MEANS OF AIRFOIL AND FUSELAGE CONNECTION

Application filed January 4, 1929. Serial No. 330,366.

This invention relates to airplane construction and my improvement is directed particularly to new connecting means, of great strength, for the attachment of airfoils to the framework of an airplane.

My invention contemplates attaching means of such nature as to render the assembly of the airfoils and fuselage extremely simple and expeditious while enabling the airfoils to become so securely rooted in the fuselage that no liability of disruption exists.

Briefly stated my improvement consists in the provision of an angle bracket of sturdy construction, provided with flanges and a web, said flanges being adapted to be bolted to the flanges of a bulkhead forming part of the fuselage structure.

Also said angle bracket has a series of projecting tongues, having aligned bolt holes.

The inner or butt end of an airfoil spar to be connected to the fuselage is encased in a metal sheath that is slotted in positions opposed to the tongues that project from the bracket, and plates of hardened steel, folded into U-formation, are fitted in said slots, aligned orifices being provided through the upper and lower surfaces of the sheath and through the folded plates.

The tongues of the bracket enter the U-plates in placing the butt end of the airfoil spar in assembled relation against the bracket that is upon the bulkhead, and in that position the holes through the tongues, sheath and U-plates all register so that a pin or bolt can be introduced to effect the union.

Other features and advantages of my invention will hereinafter appear.

In the drawing:—

Figure 1 is a partial side sectional elevation of a fuselage bulkhead and a wing spar having my improved interconnecting means.

Fig. 2 is a partial side elevation of the bulkhead.

Fig. 3 is a partial side sectional view of a spar.

Fig. 4 is a horizontal section on the line 4—4 of Fig. 1.

Fig. 5 is a section on the line 5—5 of Fig. 3, and

Fig. 6 is a perspective detail of the spar face sheath with a U-plate separated therefrom.

The fuselage bulkhead herein illustrated is composed of the upper horizontal channel member 1 and the outer vertical angle member 2, these members having inclined meeting ends to form a corner junction at 3. Also an angle member 4 lies against the under side of channel 1 and an angle truss 5 extends diagonally between angle members 2 and 4. Other bracing consists of the curved angle 6 riveted to truss 5 and a plate 6' riveted to both angle 6 and angle 2; also a curved angle 7 riveted to truss 5 and a plate 8 riveted to both angle 7 and angle 4.

The fuselage covering placed over the bulkhead aforesaid is indicated at 9.

The bulkhead construction described is sturdy and light in weight. It is reinforced for the support of an airfoil by means of a bracket having the plate 10 adapted to be placed against covering 9 over vertical angle 2, said bracket having the horizontal angular extension 11 that lies outside covering 9 over channel 1, and also having the vertical extension 12 of plate 10. A web 13 connects the parts 11 and 12 of the bracket to increase its strength and rigidity. An angled strap 14 lies against the channel 1 and angle 2, in opposed relation respectively to the parts 11 and 10 of the bracket to afford a bearing for the nuts 15 of bolts 16 which unite said parts respectively to channel 1 and angle 2. A series of spaced tongues 17 project from part 10 and its extension 12 of the bracket to engage with the spar of an airfoil in a manner to be described hereinafter, said tongues each being provided with a hole 18 extended vertically, the holes in the several tongues being axially aligned.

The wing spar herein shown as having means adapting it for engagement with the fuselage bulkhead is provided with upper and lower channel members each consisting of a horizontal web 19, vertical flanges 20 therefor, and horizontal flanges 21 extended from flanges 20. The upper channel is generally indicated by the reference character A and the lower flange by the reference character B.

The airfoil covering 22 is shown as riveted to flanges 21 of both channels A and B.

The channels A, B, are connected and braced by crossed trusses 23, stiffening plates 24 that are disposed at the butt end portion of the spar, and a sheath composed of outer plates 25, and an end plate 25′, a laminated group of trusses 23, plate 24 and an outer plate 25 being placed against the vertically aligned flanges of the upper and lower channels, A, B, at each side thereof, and secured to said flanges as by bolts 26 that are passed through the said members 20, 23, 24 and 25.

A series of slots 27 are formed horizontally in the sheath and the associated members, from the end plate 25′ inwardly, and folded plates 28 of hardened steel, of U-formation, are inserted within said slots, said plate 28 being pierced with orifices 29 that are in axial alignment through the several U-plates. The leaves of each U-plate 28 are spaced apart to provide a seat for a tongue 17 projected from the bracket on the fuselage bulkhead, the holes 18 in said tongue aligning with the holes 29 in plates 28 for the reception of a bolt 30 which thus serves to releasably unite the airfoil spar to the fuselage bulkhead.

It will be appreciated that the means of interengagement whereby a wing spar may be connected to a fuselage bulkhead provide for the secure attachment of these aircraft parts and also very greatly facilitate the assembling thereof.

Variations within the spirit and scope of my invention are equally comprehended by the foregoing disclosure.

I claim:—

Means for releasably attaching an airfoil spar to a fuselage bulkhead comprising a bracket secured to said bulkhead and provided with a number of superposed projecting tongues, said tongues having aligned holes therethrough, reinforcement for said spar comprising a sheath having side plates connected with an end plate, said end plate having superposed slots, a U-plate of hardened steel fitted in each slot to receive said tongues, said U-plates provided with holes to align with the holes in the tongues and a bolt to engage said holes for connecting said tongues and reinforcement.

Executed this 27th day of December, 1928.

VINCENT J. BURNELLI.